United States Patent
Kehlet et al.

(10) Patent No.: US 12,088,695 B2
(45) Date of Patent: Sep. 10, 2024

(54) SYSTEMS AND METHODS FOR DEVICE AUTHENTICATION IN SUPPLY CHAIN

(71) Applicant: Intel Corporation, Santa Clara, CA (US)

(72) Inventors: David Kehlet, Los Altos Hills, CA (US); Shuanghong Sun, Sunnyvale, CA (US); Saikumar Jayaraman, Chandler, AZ (US); Fariaz Karim, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 17/558,627

(22) Filed: Dec. 22, 2021

(65) Prior Publication Data

US 2022/0116206 A1   Apr. 14, 2022

(51) Int. Cl.
*H04L 9/08* (2006.01)
*G06F 7/58* (2006.01)
*H04L 9/32* (2006.01)

(52) U.S. Cl.
CPC ............ *H04L 9/0825* (2013.01); *G06F 7/586* (2013.01); *H04L 9/0866* (2013.01); *H04L 9/3247* (2013.01); *H04L 9/3263* (2013.01)

(58) Field of Classification Search
CPC ... H04L 9/0825; H04L 9/0866; H04L 9/3247; H04L 9/3263; G06F 7/586
See application file for complete search history.

(56) References Cited

U.S. PATENT DOCUMENTS

| | | | | | |
|---|---|---|---|---|---|
| 5,796,840 | A | * | 8/1998 | Davis | ............... G06Q 20/40975 713/157 |
| 6,185,546 | B1 | * | 2/2001 | Davis | .................... H04L 9/3263 713/157 |
| 2010/0275036 | A1 | * | 10/2010 | Harada | .................... G06F 21/33 713/189 |
| 2012/0321077 | A1 | * | 12/2012 | Shiota | .................... H04L 9/3247 380/44 |

(Continued)

OTHER PUBLICATIONS

Distributed Management Task Force (DMTF), "Security Protocol and Data Model (SPDM) Specification", DSP0274, Oct. 18, 2019, 58 pages, DSP0274, 0.99.0a.

(Continued)

*Primary Examiner* — J. Brant Murphy
(74) *Attorney, Agent, or Firm* — Viering, Jentschura & Partner mbB; Robert M Bilotta, Jr.

(57) ABSTRACT

A first semiconductor device includes a processor configured to generate a random number at initial test of a second semiconductor device after fabrication of the second semiconductor device in a supply chain related to the second semiconductor device, and send the generated random number to the second semiconductor device. The processor is further configured to receive a first signature that is signed over the sent random number by the second semiconductor device using a first private key that is stored in the second semiconductor device, among a first private and public key pair, and test the received first signature, using a first public key that is stored in the first semiconductor device, among the first private and public key pair, to determine whether the second semiconductor device is authenticated.

15 Claims, 5 Drawing Sheets

(56) References Cited

U.S. PATENT DOCUMENTS

| | | | | |
|---|---|---|---|---|
| 2014/0164779 A1* | 6/2014 | Hartley | ................ | H04L 9/0866 |
| | | | | 713/176 |
| 2014/0205092 A1* | 7/2014 | Hartley | ................ | H04L 9/0877 |
| | | | | 380/44 |
| 2015/0341332 A1* | 11/2015 | Smith | ................ | H04L 63/0823 |
| | | | | 713/171 |
| 2016/0275461 A1* | 9/2016 | Sprague | ............... | G06Q 20/386 |
| 2016/0294829 A1* | 10/2016 | Angus | ..................... | H04L 63/18 |
| 2017/0155508 A1* | 6/2017 | Shiota | ....................... | H04L 9/30 |
| 2019/0253417 A1* | 8/2019 | Kim | ........................ | G06F 21/60 |
| 2020/0351108 A1* | 11/2020 | Moriyama | ............ | H04L 9/0816 |
| 2021/0328779 A1* | 10/2021 | Ruan | .................... | H04L 9/0825 |
| 2021/0390179 A1* | 12/2021 | Hahn | ................... | G06F 21/71 |

OTHER PUBLICATIONS

Kerry Bernstein, "Supply Chain Hardware Integrity for Electronics Defense (SHIELD)", Microsystems Technology Office, Defense Advanced Research Projects Agency (DARPA), Apr. 2018, 10 pages.

* cited by examiner

SYSTEMS AND METHODS FOR DEVICE AUTHENTICATION IN SUPPLY CHAIN

STATEMENT REGARDING FEDERALLY SPONSORED RESEARCH OR DEVELOPMENT

This invention was made with Government support under Agreement No. N00164-19-9-0001, awarded by NSWC Crane Division. The Government has certain rights in the invention.

BACKGROUND

A system including multiple semiconductor devices may be prepared for system assembly. The system may be a multi-chip package (MCP) of the semiconductor devices, a printed circuit board and/or an assembly of multiple printed circuit boards.

Initial test such as wafer test may be performed on each semiconductor device to program test data, a die location on a wafer, a date, process data and other information into non-volatile memory of each semiconductor device. This data may be used by a system assembler to achieve a level of assurance of authenticity of each semiconductor device. The data, however, may be altered, and the alteration may escape detection.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1A:
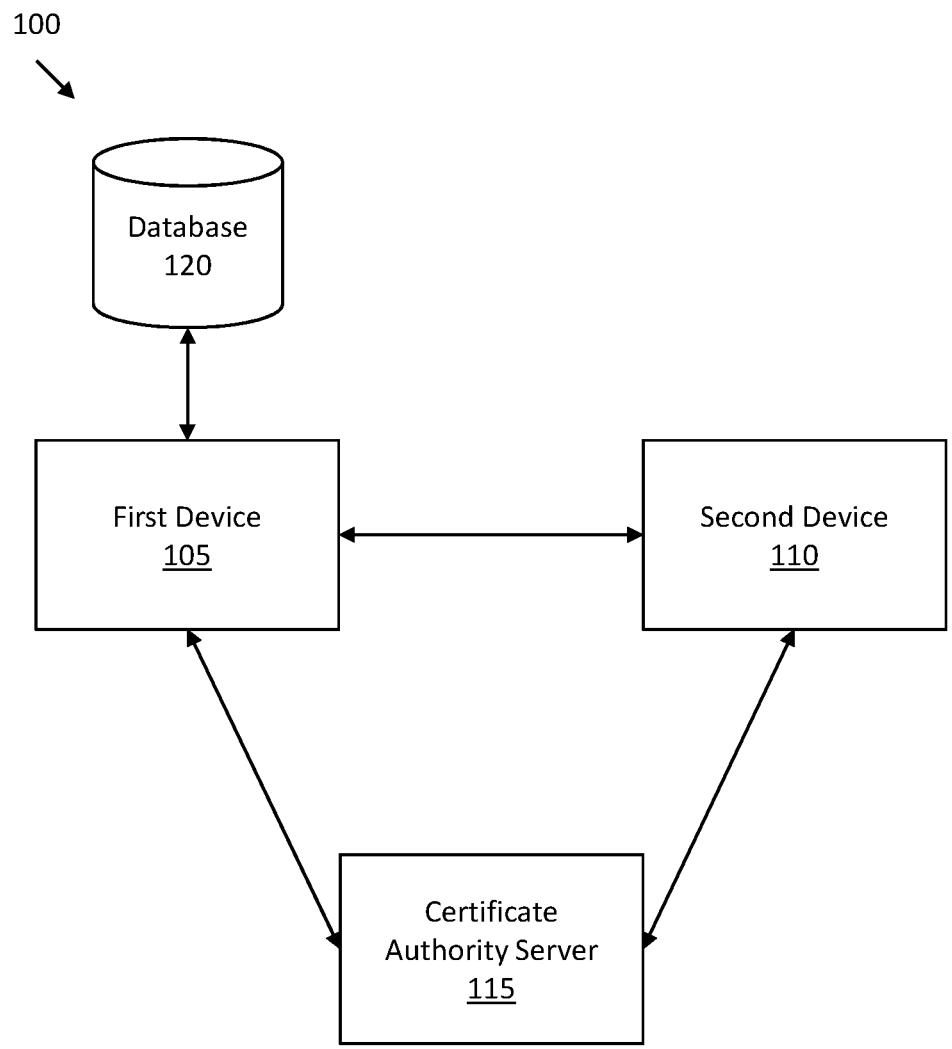
FIG. 1A shows a block diagram of a system for device authentication in a supply chain according to aspects of the present disclosure.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure generally relates to systems and methods for device authentication in a supply chain. The systems and methods may include asymmetric cryptography security applications at semiconductor devices having a scale with a target area of less than 1 $mm^2$. Further, these security applications may be used at any point in the supply chain and deployment, to check if the semicondcutor devices are authentic.

In detail, to assure supply chain integrity against counterfeit or unauthorized silicon devices, each silicon device (e.g., a chiplet, a system on chip (SoC) or a field-programmable gate array (FPGA)) may be programmed at initial test with cryptographic keys and/or a security certificate. Prior to assembly of a semiconductor device into a larger system, the semiconductor device may be challenged to produce a correct and cryptographically secure authentication response. If the semiconductor device correctly responds, the semiconductor device may be authenticated and assembled into the system. An incorrect response indicates either a device or programming failure, or a breach of the supply chain integrity.

A present first semiconductor device may include a processor configured to generate a random number at initial test of a second semiconductor device after fabrication of the second semiconductor device in a supply chain related to the second semiconductor device, and send the generated random number to the second semiconductor device. The processor is further configured to receive a first signature that is signed over the sent random number by the second semiconductor device using a first private key that is stored in the second semiconductor device, among a first private and public key pair, and test the received first signature, using a first public key that is stored in the first semiconductor device, among the first private and public key pair, to determine whether the second semiconductor device is authenticated.

In another aspect, a present method may include generating, by a first semiconductor device, a random number at initial test of a second semiconductor device after fabrication of the second semiconductor device in a supply chain related to the second semiconductor device, and sending, by the first semiconductor device, the generated random number to the second semiconductor device. The method may further include receiving, by the first semiconductor device, a first signature that is signed over the sent random number by the second semiconductor device using a first private key that is stored in the second semiconductor device, among a first private and public key pair, and testing, by the first semiconductor device, the received first signature, using a first public key that is stored in the first semiconductor device, among the first private and public key pair, to determine whether the second semiconductor device is authenticated.

In yet another aspect, a present non-transitory computer-readable medium may include instructions, which, if executed by a processor of a first semiconductor device, cause the processor to generate a random number at initial test of a second semiconductor device after fabrication of the second semiconductor device in a supply chain related to the second semiconductor device, send the generated random number to the second semiconductor device, receive a first signature that is signed over the sent random number by the second semiconductor device using a first private key that is stored in the second semiconductor device, among a first private and public key pair, and test the received first signature, using a first public key that is stored in the first semiconductor device, among the first private and public key pair, to determine whether the second semiconductor device is authenticated.

The above-described aspects allow for threat model defenses against counterfeit or malicious chiplets, SoCs and FPGAs. The aspects further defend these semiconductor devices against unauthorized use and their firmware from intellectual property (IP) theft. Also, the aspects use cryptographically secure algorithms and an authentication protocol that resist alteration and copying of data.

FIG. 1A shows a block diagram of a system 100 for device authentication in a supply chain according to aspects of the present disclosure.

Referring to FIG. 1A, the system 100 may include a first device 105, a second device 110, a certificate authority sever 115 and a database 120.

Each of the first device 105 and the second device 110 may include a semiconductor or silicon device, such as, e.g., a chiplet, an SoC or an FPGA. The first device 105 may be referred to as a security leader or test equipment, which tests the second device 110, while the second device 110 may be referred to as a security follower or device under test, which is tested by the first device 105. The first device 105 may be a semiconductor test system that is used for testing the second device 110, or for programming a private key into the second device 110. For example, a tester as the first device 105 may perform an initial test of the second device 110. The tester may program the private key, and then validate a correct programming and authentication function of the second device 110.

The first device 105 may be in communication with the second device 110. A connection between the first device 105 and the second device 110 may be made secure using a key exchange method such as, for example, Diffie-Hellman. The secure connection between the first device 105 and the second device 110 may prevent an observer from seeing the private key as it is programmed by the first device 105 into the second device 110.

The certificate authority server 115 may include a hardware server that issues one or more digital certificates, which will be further described with respect to FIG. 3 below. The certifate authority server 115 may be in communication with each of the first device 105 and the second device 110.

The database 120 may include a hardware database that stores one or more public and private keys and certificates for authentication, at initial test of each semiconductor device to program each semiconductor device with the stored one or more public and private keys and/or the certificates. The hardware database may further store one more used public keys to compare with a public key of a semiconductor device to be authenticated, which will be further described with respect to FIG. 3 below. The database 120 may be in communication with the first device 105.

The database 120 may be included in a server that assigns a public and private key pair and a certificate for the second device 110, on request from the first device 105. The first device 105 then does not need to decide which private and public key pair in the database 120 to use. In this example, the first device 105 cannot see the whole database 120 of keys and certificates, keeping the keys and certificates more secure than otherwise. The server may record, in the database 120, when a key and certificate assignment was made and to which first device the public and private key pair and the certificate were assigned. The server may further authenticate that the first device 105 is permitted to receive keys and certificates.

In an example, the communication between the database 120 and the first device 105 may be over a secure connection, e.g. an encrypted network or Internet. If the first device 105 is a semiconductor tester, and if it is assigned a function of programming a private key of the second device 110, a secure connection to the database 120 keeps the private key secure from interception. In this example, the trusted first device 105 may be installed in an untrusted initial test facility, and keys and certificates may securely be sent to the first device 105 from the database 120 and its server for programming into the second device 110.

Figure 1B:
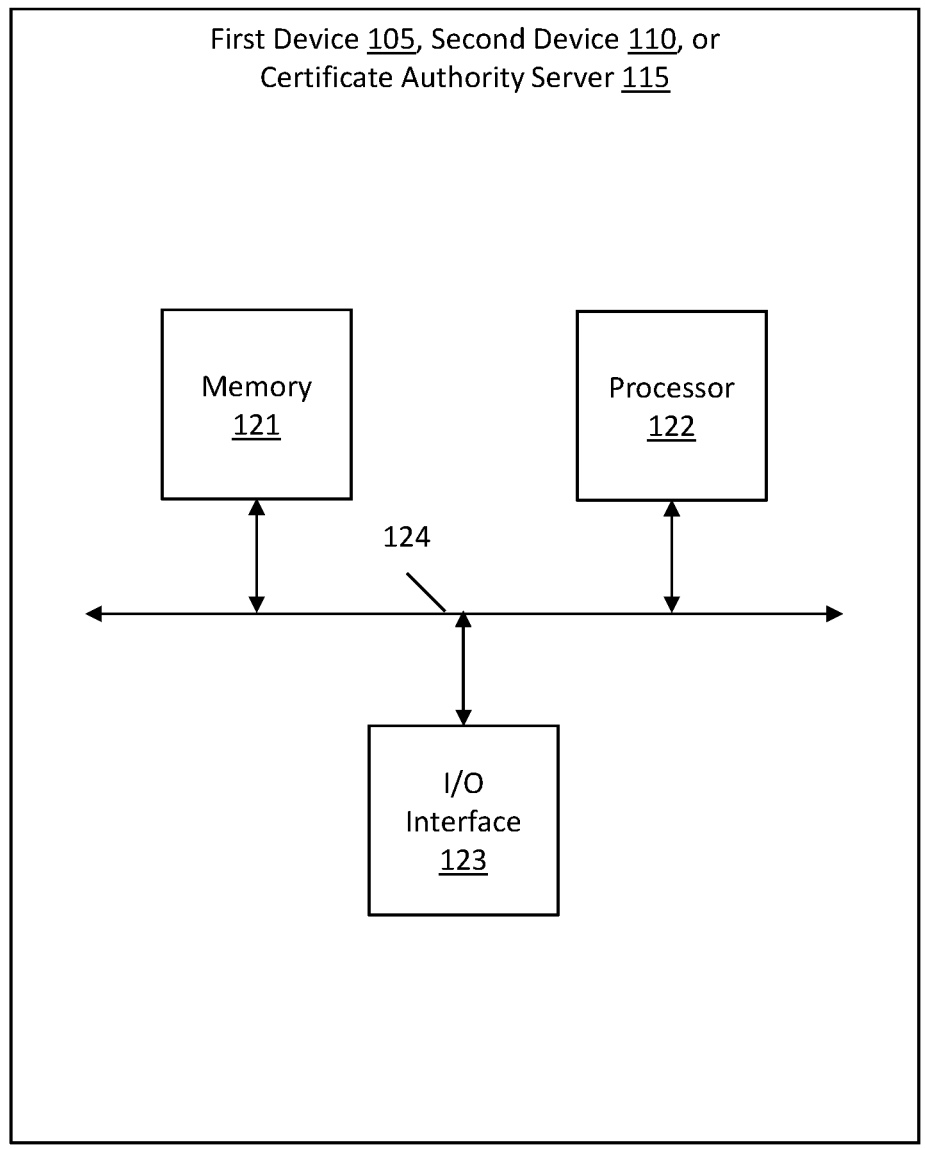
FIG. 1B shows a block diagram of a first device, a second device or a certificate authority server included in the system of FIG. 1A.

FIG. 1B shows a block diagram of the first device 105, the second device 110 or the certificate authority server 115 included in the system 100 of FIG. 1A.

Referring to FIG. 1B, each of the first device 105, the second device 110 and the certificate authority server 115 may be a semiconductor device that includes a memory 121, a processor 122, an input/output (I/O) interface 123 and a bus 124.

The memory 121 may include a volatile and/or non-volatile memory. The memory 121 stores information, such as one or more of commands, data, programs (one or more instructions), applications, etc., which are related to at least one other component of the semiconductor device and for driving and controlling the semiconductor device. For example, commands and/or data may formulate an operating system (OS). Information stored in the memory 121 may be executed by the processor 122.

In detail, the memory 121 may store one or more keys and/or certificates, which will be further described with respect to FIGS. 2 and 3 below. The memory 121 may further store the information that is executed by the processor 122 to perform functions and operations that will be further described with respect to FIGS. 2-4 below.

The processor 122 may include one or more of a central processing unit (CPU), a graphics processor unit (GPU), an accelerated processing unit (APU), a many integrated core (MIC), a field-programmable gate array (FPGA), and/or a digital signal processor (DSP). The processor 122 may be a general-purpose controller that performs control of any one or any combination of the other components of the semiconductor device, and/or performs an operation or data processing relating to communication. The processor 122 may execute one or more programs stored in the memory 121.

The I/O interface 123 may serve as a hardware and/or software interface that can, for example, transfer commands and/or data between a user and/or other external devices and other components of the semiconductor device. The I/O interface 123 may further set up communication between the semiconductor device and an external semiconductor device, such as the first device 105, the second device 110, or the certificate authority server 115. The I/O interface 123 may be connected with a network through wireless or wired communication architecture to communicate with the external semiconductor device. The I/O interface 123 may be a wired or wireless transceiver or any other component for transmitting and receiving signals.

The bus 124 may include a circuit for connecting the components 121, 122 and 123 with one another. The bus 124 functions as a communication system for transferring data between the components 121, 122 and 123 or between semiconductor devices.

The memory 121, the processor 122, the I/O interface 123 and the bus 124 are embedded or monolothic in a die of the semiconductor device. Otherwise, these components can be removed and falsified, causing security issues.

Figure 2:
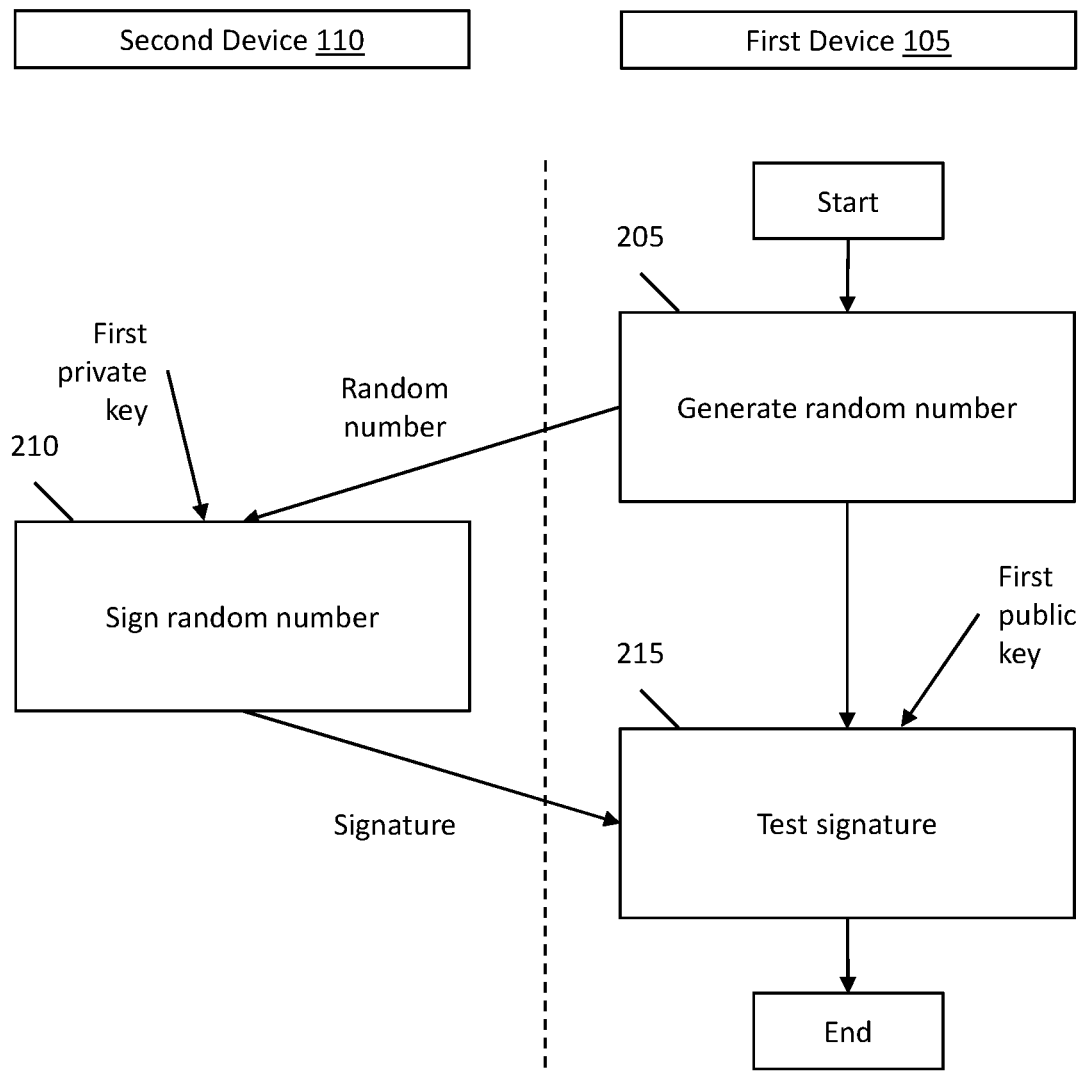
FIG. 2 shows a swimlane diagram of a method for device authentication in a supply chain according to aspects of the present disclosure.

FIG. 2 shows a swimlane diagram of a method for device authentication in a supply chain according to aspects of the present disclosure.

Referring to FIG. 2, a first private and public key pair may be generated using public key cryptography and stored in a database, e.g., the database 120 of FIG. 1A. The first private and public key pair may be generated by test equipment, the first device 105, or an external device. A first public key may be further stored in the first device 105, while a first private key may be secretly stored in the second device 110. The first private and public key pair may be generated once at initial device test after fabrication, for example, at wafer test of the first device 105 and the second device 110. The first private key may be unique for the second device 110 or shared across multiple devices to be authenticated, and if unique, unauthorized copying of the first private and public key pair may be mitigated or disallowed.

In operation 205, the first device 105 (i.e., a security leader) may start the method to authenticate the second device 110 (i.e., a security follower), e.g., once the first device 105 receives the second device 110 at a system assembly location prior to system assembly of the first device 105 with the second device 110. The system assembly may be MCP assembly of a base die (i.e., the first device 105) and a chiplet (i.e., the second device 110). Alternatively, the first device 105 may start the method to authenticate the second device 110 at initial test of the first device 105 and the second device 110.

In detail, the first device 105 may generate a random number, and send the generated random number to the second device 110. A different random number for each authentication may prevent a replay attack.

In operation 210, the second device 110 may sign or lock the random number that is received from the first device 105, using the first private key stored in the second device 110. The second device 110 may send, to the first device 105, a signature of the random number.

In operation 215, the first device 105 may test the signature that is received from the second device 110, by trying to unlock the received signature with the first public key stored in the first device 105 and the originally-generated random number. If the test is successful (i.e., the signature is unlocked or validated), then the first device 105 may determine that the second device 110 is trustworthy and authenticated and may be assembled with the first device 105. Otherwise, the first device 105 may determine that the second device 110 is untrustworthy and may not be assembled with the first device 105.

Referring again to FIG. 1A, after the system 100 is assembled (e.g., the second device 110 is assembled with the first device 105), the first device 105 and the second device 110 may be authenticated or reauthenticated using the method of FIG. 2 at every power on or reset by users downstream in the supply chain, such as end system assemblers or end users. In other words, by generating and storing the first public and private key pair and authenticating the second device 110 at the initial test or an initial point of the supply chain, a chain of trust may be started, and errors may be prevented in downstream authentications of the first device 105 and the second device 110.

In embodiments, the first device 105 and the second device 110 may be authenticated or reauthenticated using the method of FIG. 2 at other stages of the supply chain, such as, for example:
1) MCP test of an MCP after a chiplet is installed in a base die and packaged into the MCP and the MCP is powered on;
2) MCP authentication of the MCP prior to assembly of the MCP on a printed circuit board (PCB);
3) Board test of the PCB;
4) Board authentication of the PCB prior to assembly of the PCB in a system;
5) System test of the system;
6) System authentication prior to deployment;
7) Periodic or on demand authentication to check for any tampering during the deployment, e.g., at every power on or reset;
8) Authentication prior to repair;
9) Authentication on return from repair; and
10) Retirement or disposal to record removal of the chiplet from active service.

Figure 3:
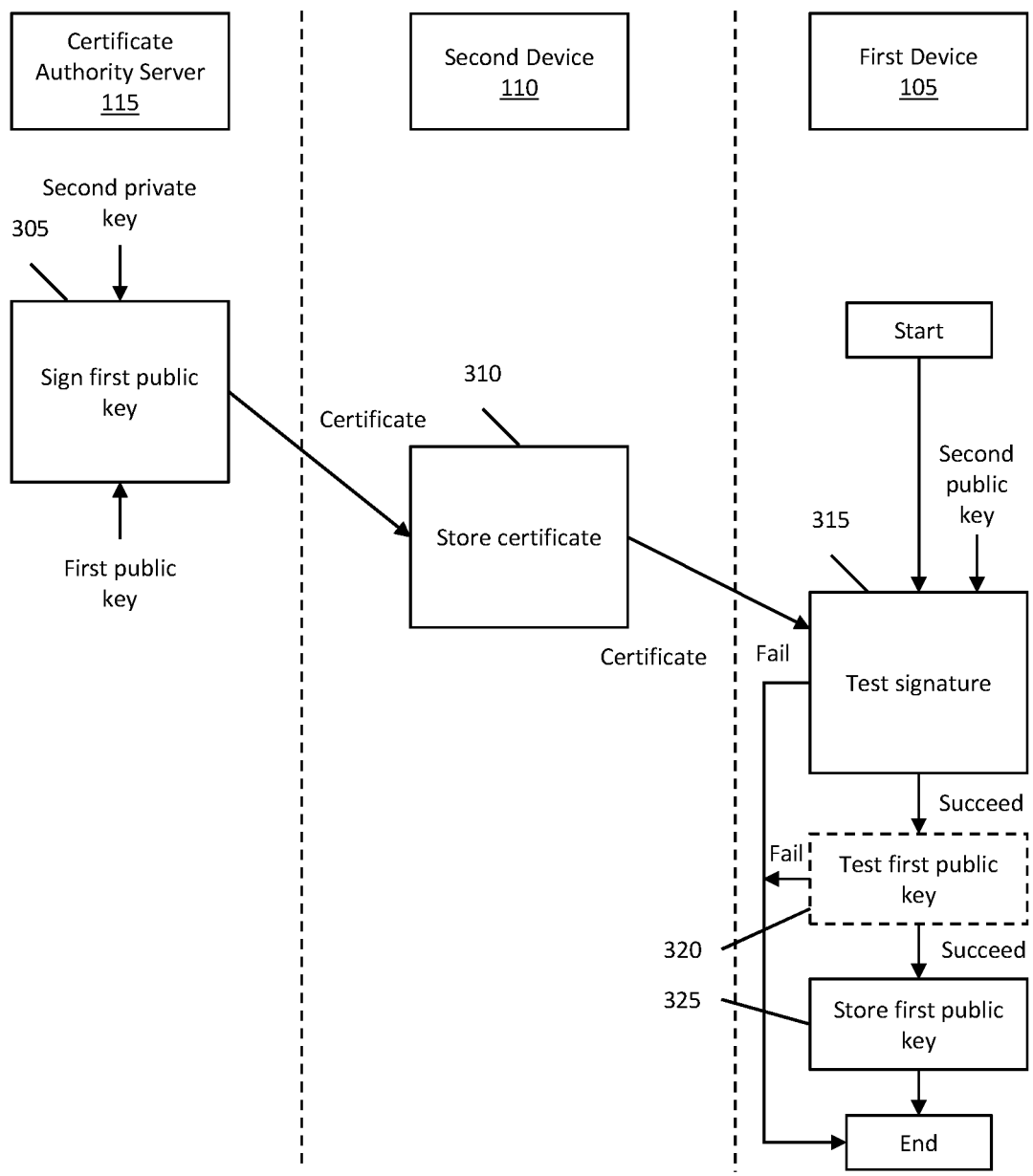
FIG. 3 shows a swimlane diagram of a method for key authentication in a supply chain according to other aspects of the present disclosure.

FIG. 3 shows a swimlane diagram of a method for key authentication in a supply chain according to other aspects of the present disclosure.

Referring to FIG. 3, the method may be performed prior to the method of FIG. 2, to authenticate the first public key to be stored in the first device 105 as described with respect to FIG. 2 above.

A second private and public key pair may be generated using public key cryptography and stored in a database, e.g., the database 120 of FIG. 1A. A second public key may be further stored in the first device 105, while a second private key may be secretly stored in the certificate authority server 115.

A first private and public key pair may be generated using public key cryptography and stored in a database, e.g., the database 120 of FIG. 1A. A first public key may be further stored in the certificate authority server 115, while a first private key may be secretly stored in the second device 110.

Both the first private and public key pair and the second private and public key pair may be generated and stored once at initial device test after fabrication, for example, at wafer test of the first device 105 and the second device 110. Further, both the first private and public key pair and the second private and public key pair may be generated by test equipment, the first device 105, or an external device.

In operation 305, for the second private and public key pair, the certificate authority server 115 may sign or lock the first public key, using the second private key stored in the certificate authority server 115. The certiface authority server 115 may send, to the second device 110, a certificate including the first public key itself and a signature of the first public key. This signature that is generated by the certificate authority server 115 indicates that the first public key is an authentic public key. The certificate may be unique for the second device 110 or shared across multiple second devices to be authenticated, and if unique, unauthorized copying of the certificate may be mitigated or disallowed.

In operation 310, the second device 110 stores the certificate that is received from the certificate authority server 115, at initial device test after fabrication, for example, at wafer test of the second device 110.

In operation 315, the first device 105 (i.e., a security leader) may start the method to authenticate the first public key that is received from the second device 110 (i.e., a security follower), e.g., once the first device 105 receives the second device 110 at a system assembly location prior to system assembly of the first device 105 with the second device 110. The system assembly may be MCP assembly of a base die (i.e., the first device 105) and a chiplet (i.e., the second device 110). Alternatively, the first device 105 may start the method to authenticate the first public key received from the second device 110 at initial test of the first device 105 and the second device 110.

In detail, the first device 105 may sense the certificate stored in the second device 110 and test the signature included in the sensed certificate, by trying to unlock the signature with the second public key stored in the first device 105 to authenticate the first public key received from the second device 110. If the test is successful (i.e., the signature is unlocked or validated), then the first device 105 may continue to check the first public key. Otherwise, the first device 105 may determine that first public key is untrustworthy, and may end the method.

In operation 320, the first device 105 may access a database (e.g., the database 120 of FIG. 1A) of one or more used public keys, and compare or test these used public keys with the first public key received from the second device 110, to detect uniqueness of the first public key. If the first public key has already been used at the system assembly location by matching with at least one of the used public keys, then the first device 105 may report a possible supply chain breach, and may end the method. Otherwise, the first device 105 may determine that the first public key is trustworthy and authenticated, and may continue the method. Operation 320 may be omitted as it is an additional test for security being broken and only applies if the first public key is required to be unique to the second device 110.

In operation 325, the first device 105 stores (i.e., authenticates) the first public key included in the received certificate. The first device 105 may now use the stored first public key to authenticate the second device 110 in the method as discussed with respect to FIG. 2 above.

The method of FIG. 3 allows different semiconductor devices having different public and private key pairs with respect to the second device 110 to be authenticated by the first device 105, because the first device 105 only needs the second public key to authenticate the different semiconductor devices. This is because in the method of FIG. 3, the second device 110 provides its public key (e.g., the first public key) to the first device 105.

Figure 4:
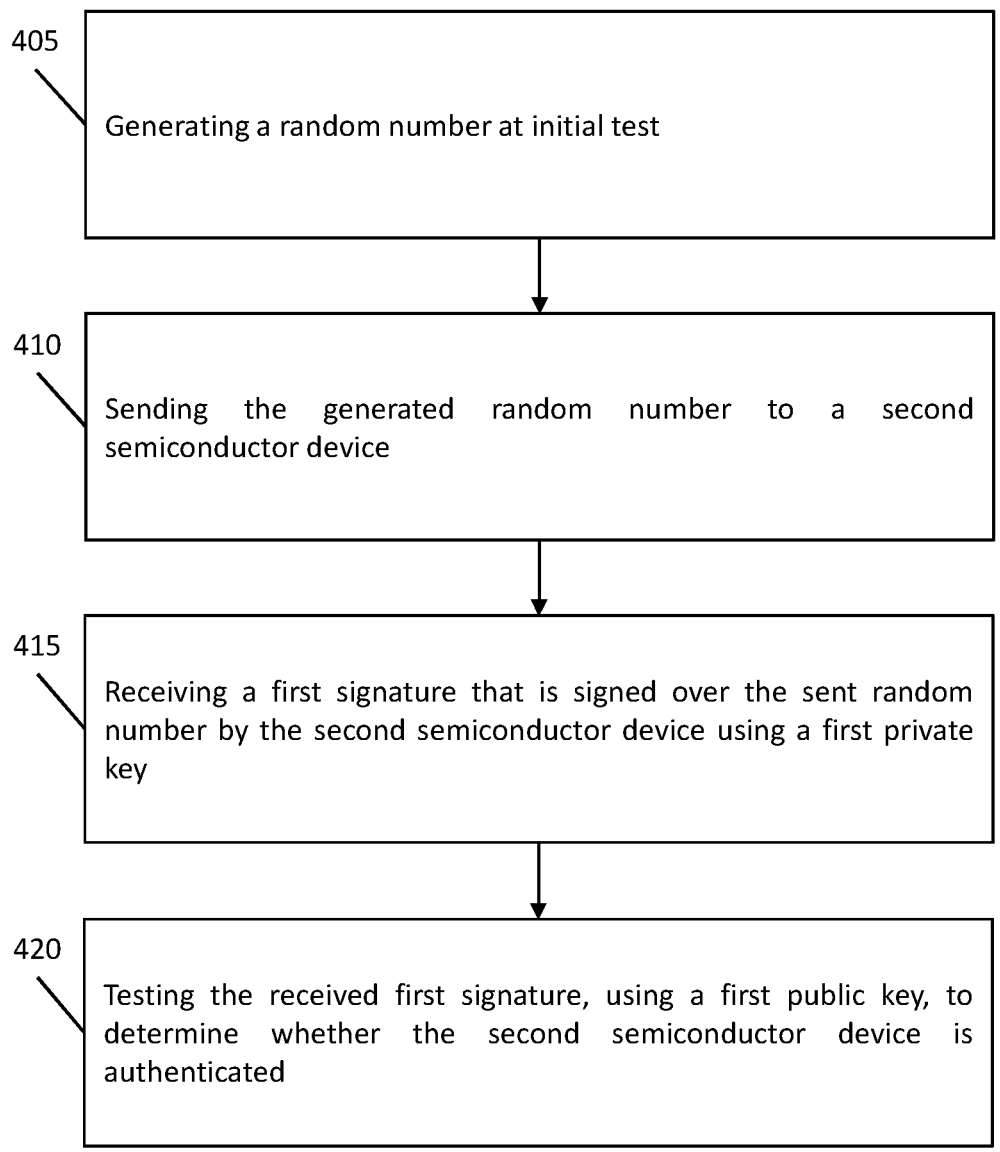
FIG. 4 shows a flow diagram of a method for device authentication in a supply chain according to aspects of the present disclosure.

FIG. 4 shows a flow diagram of a method for device authentication in a supply chain according to aspects of the present disclosure.

Operation 405 may be directed to generating, by a first semiconductor device, a random number at initial test of a second semiconductor device after fabrication of the second semiconductor device in a supply chain related to the second semiconductor device.

Operation 410 may be directed to sending, by the first semiconductor device, the generated random number to the second semiconductor device.

Operation 415 may be directed to receiving, by the first semiconductor device, a first signature that is signed over the sent random number by the second semiconductor device using a first private key that is stored in the second semiconductor device, among a first private and public key pair.

Operation 420 may be directed to testing, by the first semiconductor device, the received first signature, using a first public key that is stored in the first semiconductor device, among the first private and public key pair, to determine whether the second semiconductor device is authenticated.

The testing the received first signature may include, based on the generated random number and based on the received first signature being unlocked by the first public key, determining, by the first semiconductor device, that the second semiconductor device is authenticated.

The method may further include receiving, by the first semiconductor device, from the second semiconductor device at the initial test, a certificate including a second signature and the first public key, the second signature that is signed over the first public key by a certificate authority server using a second private key, among a second private and public key pair, and testing, by the first semiconductor device, the received second signature, using a second public key, among the second private and public key pair, to determine whether the first public key is authenticated.

The testing the received second signature may include, based on the first public key and based on the received second signature being unlocked by the second public key, determining, by the first semiconductor device, that the first public key included in the certificate is authenticated, and storing, by the first semiconductor device, the first public key for testing the received first signature.

The method may further include, based on the first public key and based on the received second signature being unlocked by the second public key, testing, by the first semiconductor device, the first public key included in the certificate, with one or more used public keys, to determine whether the first public key is used. The testing the first public key may include, based on the first public key included in the certificate matching at least one among the one or more used public keys, determining, by the first semiconductor device, that the first public key is used, and reporting, by the first semiconductor device, a possible breach of the supply chain, and based on the first public key included in the certificate not matching any among the one or more used public keys, determining, by the first semiconductor device, that the first public key is authenticated, and storing, by the first semiconductor device, the first public key for testing the received first signature.

The certificate may be further received when the first semiconductor device receives the second semiconductor device at a system assembly location prior to system assembly of the first semiconductor device with the second semiconductor device.

The first private and public key pair may be generated at the initial test.

The random number may be further generated when the first semiconductor device receives the second semiconductor device at a system assembly location prior to system assembly of the first semiconductor device with the second semiconductor device.

The random number may be further generated at every power on or reset of the second semiconductor device that is downstream in the supply chain.

The methods and sequence of steps presented above are intended to be examples for device authentication in a supply chains according to the present disclosure. It will be apparent to those ordinary skilled practitioners that the foregoing process operations may be modified without departing from the spirit of the present disclosure.

To more readily understand and put into practical effect the present apparatuses and methods, particular aspects will now be described by way of examples. For the sake of brevity, duplicate descriptions of features and properties may be omitted.

EXAMPLES

Example 1 provides a first semiconductor device including a processor configured to generate a random number at initial test of a second semiconductor device after fabrication of the second semiconductor device in a supply chain related to the second semiconductor device, and send the generated random number to the second semiconductor device. The processor is further configured to receive a first signature that is signed over the sent random number by the second semiconductor device using a first private key that is stored in the second semiconductor device, among a first private and public key pair, and test the received first signature, using a first public key that is stored in the first semiconductor device, among the first private and public key pair, to determine whether the second semiconductor device is authenticated.

Example 2 may include the apparatus of example 1 and/or any other example disclosed herein, for which the processor may be further configured to, based on the generated random number and based on the received first signature being unlocked by the first public key, determine that the second semiconductor device is authenticated.

Example 3 may include the apparatus of example 1 and/or any other example disclosed herein, for which the processor may be further configured to receive, from the second semiconductor device at the initial test, a certificate including a second signature and the first public key, the second signature that is signed over the first public key by a certificate authority server using a second private key, among a second private and public key pair, and test the received second signature, using a second public key, among the second private and public key pair, to determine whether the first public key is authenticated.

Example 4 may include the apparatus of example 3 and/or any other example disclosed herein, for which the processor may be further configured to, based on the first public key and based on the received second signature being unlocked by the second public key, determine that the first public key included in the certificate is authenticated, and store the first public key for testing the received first signature.

Example 5 may include the apparatus of example 3 and/or any other example disclosed herein, for which the processor may be further configured to, based on the first public key and based on the received second signature being unlocked by the second public key, test the first public key included in the certificate, with one or more used public keys, to determine whether the first public key is used, and based on the first public key included in the certificate matching at least one among the one or more used public keys, determine that the first public key is used, and report a possible breach of the supply chain. The processor may be further configured to, based on the first public key included in the certificate not matching any among the one or more used public keys, determine that the first public key is authenticated, and store the first public key for testing the received first signature.

Example 6 may include the apparatus of example 3 and/or any other example disclosed herein, for which the certificate may be further received when the first semiconductor device receives the second semiconductor device at a system assembly location prior to system assembly of the first semiconductor device with the second semiconductor device.

Example 7 may include the apparatus of example 1 and/or any other example disclosed herein, for which the first private and public key pair may be generated at the initial test.

Example 8 may include the apparatus of example 1 and/or any other example disclosed herein, for which the random number may be further generated when the first semiconductor device receives the second semiconductor device at a system assembly location prior to system assembly of the first semiconductor device with the second semiconductor device.

Example 9 may include the apparatus of example 1 and/or any other example disclosed herein, for which the random number may be further generated at every power on or reset of the second semiconductor device that is downstream in the supply chain.

Example 10 provides a method including generating, by a first semiconductor device, a random number at initial test of a second semiconductor device after fabrication of the second semiconductor device in a supply chain related to the second semiconductor device, and sending, by the first semiconductor device, the generated random number to the second semiconductor device. The method further includes receiving, by the first semiconductor device, a first signature that is signed over the sent random number by the second semiconductor device using a first private key that is stored in the second semiconductor device, among a first private and public key pair, and testing, by the first semiconductor device, the received first signature, using a first public key that is stored in the first semiconductor device, among the first private and public key pair, to determine whether the second semiconductor device is authenticated.

Example 11 may include the apparatus of example 10 and/or any other example disclosed herein, for which the testing the received first signature may include, based on the generated random number and based on the received first signature being unlocked by the first public key, determining, by the first semiconductor device, that the second semiconductor device is authenticated.

Example 12 may include the apparatus of example 10 and/or any other example disclosed herein, for which the method may further include receiving, by the first semiconductor device, from the second semiconductor device at the initial test, a certificate including a second signature and the first public key, the second signature that is signed over the first public key by a certificate authority server using a second private key, among a second private and public key pair, and testing, by the first semiconductor device, the received second signature, using a second public key, among the second private and public key pair, to determine whether the first public key is authenticated.

Example 13 may include the apparatus of example 12 and/or any other example disclosed herein, for which the testing the received second signature may include, based on the first public key and based on the received second signature being unlocked by the second public key, determining, by the first semiconductor device, that the first public key included in the certificate is authenticated, and storing, by the first semiconductor device, the first public key for testing the received first signature.

Example 14 may include the apparatus of example 12 and/or any other example disclosed herein, for which, the method may further include, based on the first public key and based on the received second signature being unlocked by the second public key, testing, by the first semiconductor device, the first public key included in the certificate, with one or more used public keys, to determine whether the first public key is used. The testing the first public key may include, based on the first public key included in the certificate matching at least one among the one or more used public keys, determining, by the first semiconductor device, that the first public key is used, and reporting, by the first semiconductor device, a possible breach of the supply chain, and based on the first public key included in the certificate not matching any among the one or more used public keys, determining, by the first semiconductor device, that the first public key is authenticated, and storing, by the first semiconductor device, the first public key for testing the received first signature.

Example 15 may include the apparatus of example 12 and/or any other example disclosed herein, for which the certificate may be further received when the first semiconductor device receives the second semiconductor device at a system assembly location prior to system assembly of the first semiconductor device with the second semiconductor device.

Example 16 may include the apparatus of example 10 and/or any other example disclosed herein, for which the first private and public key pair may be generated at the initial test.

Example 17 may include the apparatus of example 10 and/or any other example disclosed herein, for which the random number may be further generated when the first semiconductor device receives the second semiconductor device at a system assembly location prior to system assembly of the first semiconductor device with the second semiconductor device.

Example 18 may include the apparatus of example 10 and/or any other example disclosed herein, for which the random number may be further generated at every power on or reset of the second semiconductor device that is downstream in the supply chain.

Example 19 provides a non-transitory computer-readable medium including instructions, which, if executed by a processor of a first semiconductor device, cause the processor to generate a random number at initial test of a second semiconductor device after fabrication of the second semiconductor device in a supply chain related to the second semiconductor device, and send the generated random number to the second semiconductor device. The instructions, which, if executed by the processor, further cause the processor to receive a first signature that is signed over the sent random number by the second semiconductor device using a first private key that is stored in the second semiconductor device, among a first private and public key pair, and test the received first signature, using a first public key that is stored in the first semiconductor device, among the first private and public key pair, to determine whether the second semiconductor device is authenticated.

Example 20 may include the apparatus of example 19 and/or any other example disclosed herein, for which the instructions, which, if executed by the processor, further cause the processor to receive, from the second semiconductor device at the initial test, a certificate including a second signature and the first public key, the second signature that is signed over the first public key by a certificate authority server using a second private key, among a second private and public key pair, and test the received second signature, using a second public key, among the second private and public key pair, to determine whether the first public key is authenticated.

Example 21 provides an apparatus including generating means for generating a random number at initial test of a second semiconductor device after fabrication of the second semiconductor device in a supply chain related to the second semiconductor device, and sending means for sending the generated random number to the second semiconductor device. The apparatus further includes first receiving means for receiving a first signature that is signed over the sent random number by the second semiconductor device using a first private key that is stored in the second semiconductor device, among a first private and public key pair, and first testing means for testing the received first signature, using a first public key that is stored in the first semiconductor device, among the first private and public key pair, to determine whether the second semiconductor device is authenticated.

Example 22 may include the apparatus of example 21 and/or any other example disclosed herein, for which the apparatus further includes second receiving means for receiving, from the second semiconductor device at the initial test, a certificate including a second signature and the first public key, the second signature that is signed over the first public key by a certificate authority server using a second private key, among a second private and public key pair, and second testing means for testing the received second signature, using a second public key, among the second private and public key pair, to determine whether the first public key is authenticated.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. A first semiconductor device comprising:
   a processor configured to:
   generate a random number at initial test of a second semiconductor device after fabrication of the second semiconductor device;
   send the generated random number to the second semiconductor device;
   receive a first signature that is signed over the sent random number by the second semiconductor device using a first private key that is stored in the second semiconductor device, among a first private and public key pair; and
   determine whether the second semiconductor device is authenticated comprising to test the received first signature, using a first public key that is stored in the first semiconductor device, among the first private and public key pair, receive, from the second semiconductor device at the initial test, a certificate comprising a second signature and the first public key, the second signature that is signed over the first public key by a certificate authority server using a second private key, among a second private and public key pair; and test the received second signature, using a second public key, among the second private and public key pair, to determine whether the first public key is authenticated;

wherein the processor is further configured to, based on the first public key and based on the received second signature being unlocked by the second public key:
determine that the first public key comprised in the certificate is authenticated; and
store the first public key for testing the received first signature.

2. The first semiconductor device of claim 1, wherein the processor is further configured to, based on the generated random number and based on the received first signature being unlocked by the first public key, determine that the second semiconductor device is authenticated.

3. The first semiconductor device of claim 1, wherein the processor is further configured to:
based on the first public key and based on the received second signature being unlocked by the second public key, test the first public key comprised in the certificate, with one or more used public keys, to determine whether the first public key is used;
based on the first public key comprised in the certificate matching at least one among the one or more used public keys, determine that the first public key is used, and report a possible breach of a supply chain; and
based on the first public key comprised in the certificate not matching any among the one or more used public keys, determine that the first public key is authenticated, and store the first public key for testing the received first signature.

4. The first semiconductor device of claim 1, wherein the certificate is further received when the first semiconductor device receives the second semiconductor device at a system assembly location prior to system assembly of the first semiconductor device with the second semiconductor device.

5. The first semiconductor device of claim 1, wherein the first private and public key pair is generated at the initial test.

6. The first semiconductor device of claim 1, wherein the random number is further generated when the first semiconductor device receives the second semiconductor device at a system assembly location prior to system assembly of the first semiconductor device with the second semiconductor device.

7. The first semiconductor device of claim 1, wherein the random number is further generated at every power on or reset of the second semiconductor device that is downstream in a supply chain.

8. A method comprising:
generating, by a first semiconductor device, a random number at initial test of a second semiconductor device after fabrication of the second semiconductor device;
sending, by the first semiconductor device, the generated random number to the second semiconductor device;
receiving, by the first semiconductor device, a first signature that is signed over the sent random number by the second semiconductor device using a first private key that is stored in the second semiconductor device, among a first private and public key pair; and determining whether the second semiconductor device is authenticated comprising testing, by the first semiconductor device, the received first signature, using a first public key that is stored in the first semiconductor device, among the first private and public key pair;
receiving, by the first semiconductor device, from the second semiconductor device at the initial test, a certificate comprising a second signature and the first public key, the second signature that is signed over the first public key by a certificate authority server using a second private key, among a second private and public key pair; and
testing, by the first semiconductor device, the received second signature, using a second public key, among the second private and public key pair, to determine whether the first public key is authenticated;
wherein the testing the received second signature comprises, based on the first public key and based on the received second signature being unlocked by the second public key:
determining, by the first semiconductor device, that the first public key comprised in the certificate is authenticated; and
storing, by the first semiconductor device, the first public key for testing the received first signature.

9. The method of claim 8, wherein the testing the received first signature comprises, based on the generated random number and based on the received first signature being unlocked by the first public key, determining, by the first semiconductor device, that the second semiconductor device is authenticated.

10. The method of claim 8, further comprising,
based on the first public key and based on the received second signature being unlocked by the second public key, testing, by the first semiconductor device, the first public key comprised in the certificate, with one or more used public keys, to determine whether the first public key is used,
wherein the testing the first public key comprises:
based on the first public key comprised in the certificate matching at least one among the one or more used public keys, determining, by the first semiconductor device, that the first public key is used, and reporting, by the first semiconductor device, a possible breach of a supply chain; and
based on the first public key comprised in the certificate not matching any among the one or more used public keys, determining, by the first semiconductor device, that the first public key is authenticated, and storing, by the first semiconductor device, the first public key for testing the received first signature.

11. The method of claim 8, wherein the certificate is further received when the first semiconductor device receives the second semiconductor device at a system assembly location prior to system assembly of the first semiconductor device with the second semiconductor device.

12. The method of claim 8, wherein the first private and public key pair is generated at the initial test.

13. The method of claim 8, wherein the random number is further generated when the first semiconductor device receives the second semiconductor device at a system assembly location prior to system assembly of the first semiconductor device with the second semiconductor device.

14. The method of claim 8, wherein the random number is further generated at every power on or reset of the second semiconductor device that is downstream in a supply chain.

15. A non-transitory computer-readable medium comprising instructions, which, if executed by a processor of a first semiconductor device, cause the processor to:

generate a random number at initial test of a second semiconductor device after fabrication of the second semiconductor device;

send the generated random number to the second semiconductor device;

receive a first signature that is signed over the sent random number by the second semiconductor device using a first private key that is stored in the second semiconductor device, among a first private and public key pair;

determine whether the second semiconductor device is authenticated comprising to test the received first signature, using a first public key that is stored in the first semiconductor device, among the first private and public key pair;

receive, from the second semiconductor device at the initial test, a certificate comprising a second signature and the first public key, the second signature that is signed over the first public key by a certificate authority server using a second private key, among a second private and public key pair; and test the received second signature, using a second public key, among the second private and public key pair, to determine whether the first public key is authenticated, wherein the processor is further caused to, based on the first public key and based on the received second signature being unlocked by the second public key:

determine that the first public key comprised in the certificate is authenticated; and store the first public key for testing the received first signature.

* * * * *